United States Patent [19]

Boland et al.

[11] Patent Number: 4,726,566
[45] Date of Patent: Feb. 23, 1988

[54] TRUCK-MOUNTED CABLE PULLING SYSTEM

[75] Inventors: Donald P. Boland, Downers Grove; William Menz, Villa Olivia; Glen R. Seimetz, Hanover Park, all of Ill.

[73] Assignee: Illinois Bell Telephone Company, Chicago, Ill.

[21] Appl. No.: 827,766

[22] Filed: Feb. 7, 1986

[51] Int. Cl.$^4$ .............................................. B66D 3/00
[52] U.S. Cl. ......................... 254/325; 254/134.3 FT; 254/361
[58] Field of Search ............... 254/134.3 R, 134.3 FT, 254/325, 328, 361

[56] References Cited

U.S. PATENT DOCUMENTS

| | | | |
|---|---|---|---|
| 3,218,033 | 11/1965 | Miller | 254/134.3 FT |
| 3,788,605 | 1/1974 | Johnson | 254/328 X |
| 3,829,064 | 8/1974 | Jackson | 254/134.3 R X |
| 4,382,581 | 5/1983 | Wimer et al. | 254/134.3 FT |
| 4,454,999 | 6/1984 | Woodruff | 254/134.3 FT X |
| 4,465,261 | 8/1984 | Giroux | 254/134.3 FT X |
| 4,469,306 | 9/1984 | Wimer et al. | 254/134.3 FT |
| 4,596,380 | 6/1986 | Elzy et al. | 254/134.3 FT |

OTHER PUBLICATIONS

Pp. 1, 2 and 5 of Arnco Equipment Catalog, 1984.

Primary Examiner—Stuart S. Levy
Assistant Examiner—Katherine Matecki
Attorney, Agent, or Firm—Emrich & Dithmar

[57] ABSTRACT

A cable pulling system includes a pickup truck having on-board hydraulic and electrical systems, the hydraulic system including a pump driven by the truck engine, a reservoir tank mounted in the truck cargo bed and associated plumbing. An equipment module is removably mountable on the cargo bed and comprises a pallet which carries a hydraulic control console adapted to be coupled to the hydraulic system, a sump pump removably disposed in a support, a hydraulic winch motor and a take-up reel respectively removably mounted on pivoting supports, a reel of hydraulic conduit having one end thereof coupled to the hydraulic system and the other end adapted to be coupled to the sump pump, and an extension reel of hydraulic conduit for coupling the winch motor or the sump pump to the hydraulic system. The winch motor and take-up reel are mounted on a bumper support for use. A tension controller is supported in use on a tray which can be mounted on the take-up reel storage support after the reel has been removed therefrom. The tension controller is coupled to the electrical system and to the hydraulic motor for controlling the tension applied to the cable being pulled.

19 Claims, 8 Drawing Figures

TRUCK-MOUNTED CABLE PULLING SYSTEM

BACKGROUND OF THE INVENTION

The present invention relates to apparatus for placing cables, such a fiber optic cables, in underground conduit or ductwork. In particular, the invention relates to improvements in a vehicle utilized for cable pulling operations.

Many utility cables are today disposed in underground ducts. Special systems are utilized for placing cables in the ducts. In recent years much new communication cable is fiber optic cable. Special problems are created in handling fiber optic cable and, therefore, special cable systems have been devised for use by utilities companies, such as telephone companies, for placing fiber optic cable in underground ducts.

For this purpose the utility companies may utilize specially designed trucks which carry a cable placing system to the field location. Typically, access to the underground ductwork is provided by manholes disposed at spaced-apart locations along the duct path. The cable placing system includes a cable pulling system which has a specially designed winch assembly to take up a pulling tape, which is in turn connected to the leading end of a cable section for pulling it through a length of duct between two manholes. The electrical and/or hydraulic power for operating the cable pulling system may be carried on board the truck.

At present, the various components of the cable pulling system, such as the winch assembly, hydraulic control console, hydraulic conduits and the like are each permanently mounted on the truck independently of each other. Thus, if one part of the system requires service or maintenance the entire truck must be removed from service. Furthermore, the permanent mounting of the cable pulling system in the truck militates against use of the truck for other purposes.

SUMMARY OF THE INVENTION

It is a general object of the invention to provide a vehicle-mounted cable pulling system which avoids the disadvantages of prior systems while affording additional structural and operating advantages.

An important feature of the invention is the provision of a vehicle-mounted cable pulling system which permits removal of portions of the system from service without removing the vehicle from service.

In connection with the foregoing feature, it is another feature of the invention to provide a cable pulling system of the type set forth, which permits use of the vehicle for other purposes.

In connection with the foregoing features, it is another feature of the invention to provide an equipment module which carries most of the components of the cable pulling system and is removably mountable in the vehicle.

Yet another feature of the invention is the provision of a vehicle which is uniquely adapted to incorporate such an equipment module.

These and other features of the invention are attained by providing an equipment module for use in a cable pulling system which includes a vehicle with an on-board hydraulic drive system having a reservoir of hydraulic fluid, a pump and associated plumbing, the module comprising: a frame adapted to be removably mounted on the associated vehicle, a hydraulic control console mounted on the frame and adapted to be coupled to the hydraulic drive system when the frame is mounted on the vehicle, a hydraulic winch motor, first support means mounted on the frame for removably supporting the motor in a storage condition, a cable take-up reel, and second support means mounted on the frame for removably supporting the reel in a storage condition.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
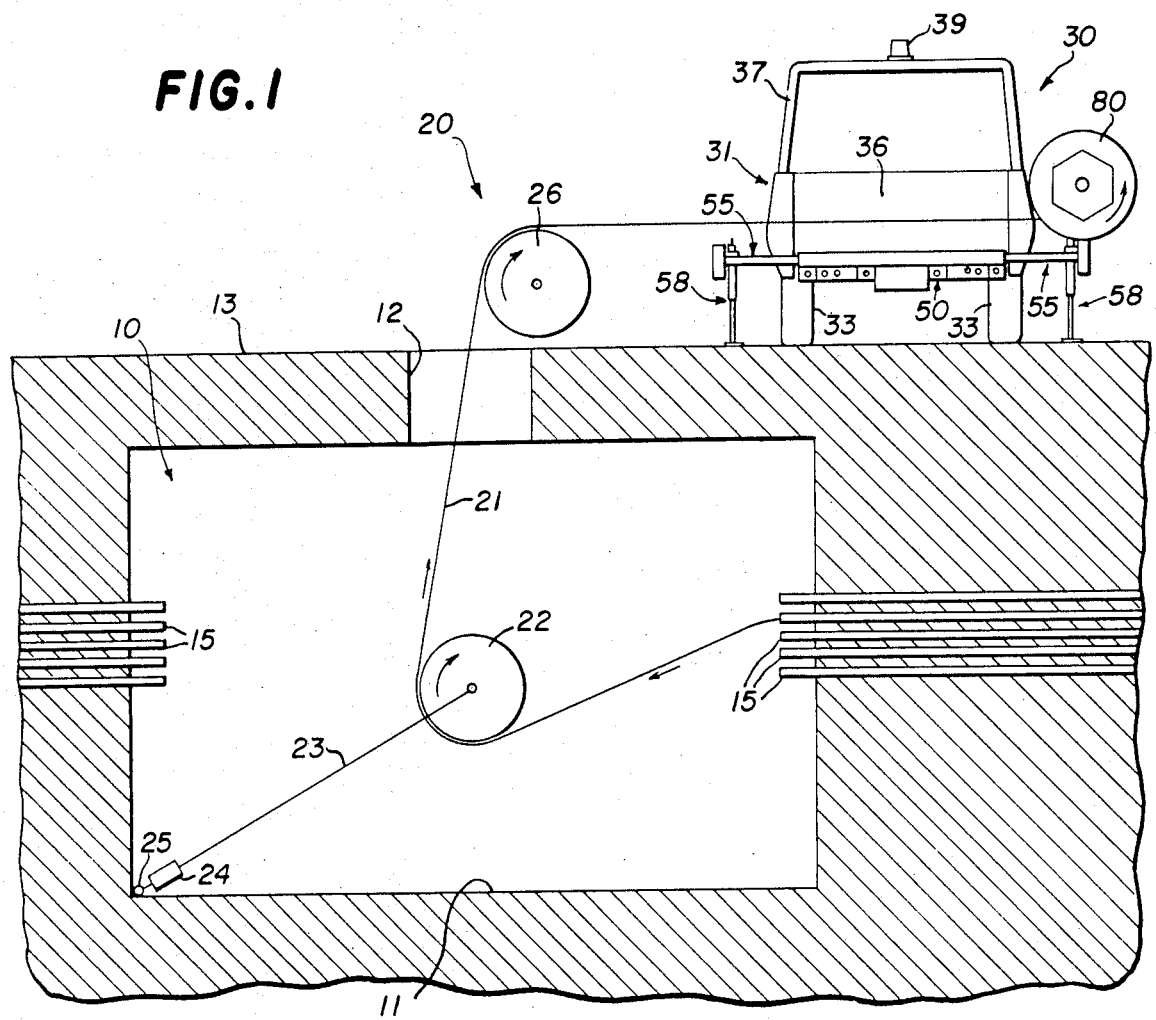
FIG. 1 is a view in vertical section of a manhole between two underground duct sections, and illustrating in elevation a vehicle-mounted cable pulling system set up in use for pulling cable through one of the duct sections.

Referring to FIG. 1, there is illustrated a portion of an underground duct system 10 of the type in connection with which the present invention is intended to be used. The system 10 includes a number of underground chambers 11 (one shown) at spaced apart locations along the duct work. Each chamber 11 has a manhole 12 providing access from the surface 13 of the ground or roadway. Duct sections 15 extend between adjacent chambers 11 for carrying communication cable, such as fiber optic cable.

The communication cable is placed in selected ones of the duct sections 15 by a cable placing system 20. The system 20, which is of known construction, includes a cable pulling tape 21 which may be disposed in the duct section 15, as manufactured, or may be inserted therein after installation of the duct by the use of a pneumatic tape gun. One end of the tape 21, at the insertion end of the duct section 15, is coupled to the leading end of the communication cable (not shown). The pulling end of the communication cable (not shown). The pulling end of the tape 21 is then fed around a bull wheel 22, which is disposed in the chamber 11 and coupled by a cable 23 to a pulling eye 24 which is anchored in the chamber 11, as at 25. The tape 21 is then fed up through the manhole 12, around a skid wheel 26 and thence to the take-up reel 80 of a cable pulling system 30, constructed in accordance with and embodying the features of the present invention. The cable pulling system 30 then operates to wind up the tape 21 on the take-up reel 80, pulling the communication cable through the duct section 15 in a known manner. The cable placing system 20 is then moved to the next chamber 11 and the process is repeated.

Figure 2:
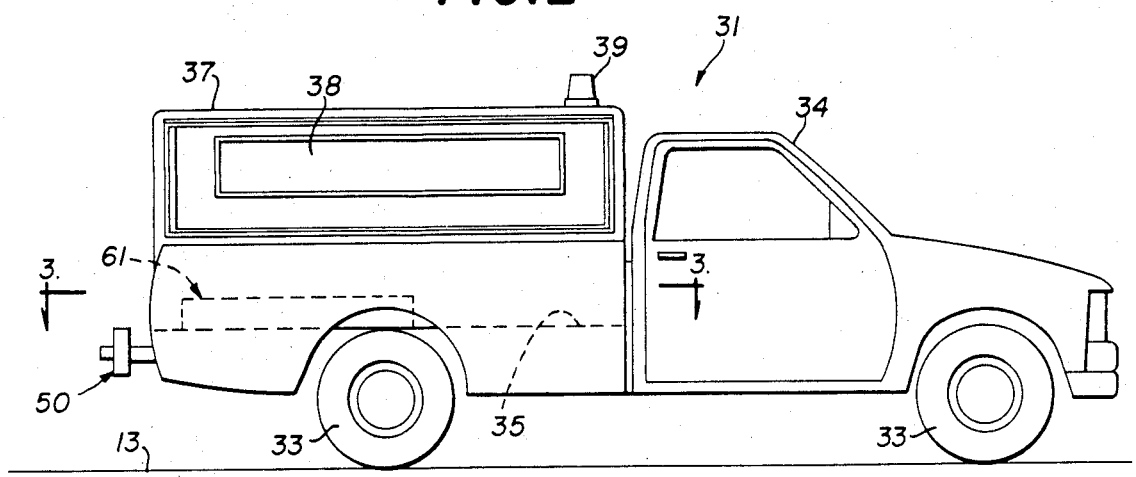
FIG. 2 is a side elevational view of the vehicle of FIG. 1, with all portions of the system stowed therein.
Figure 3:
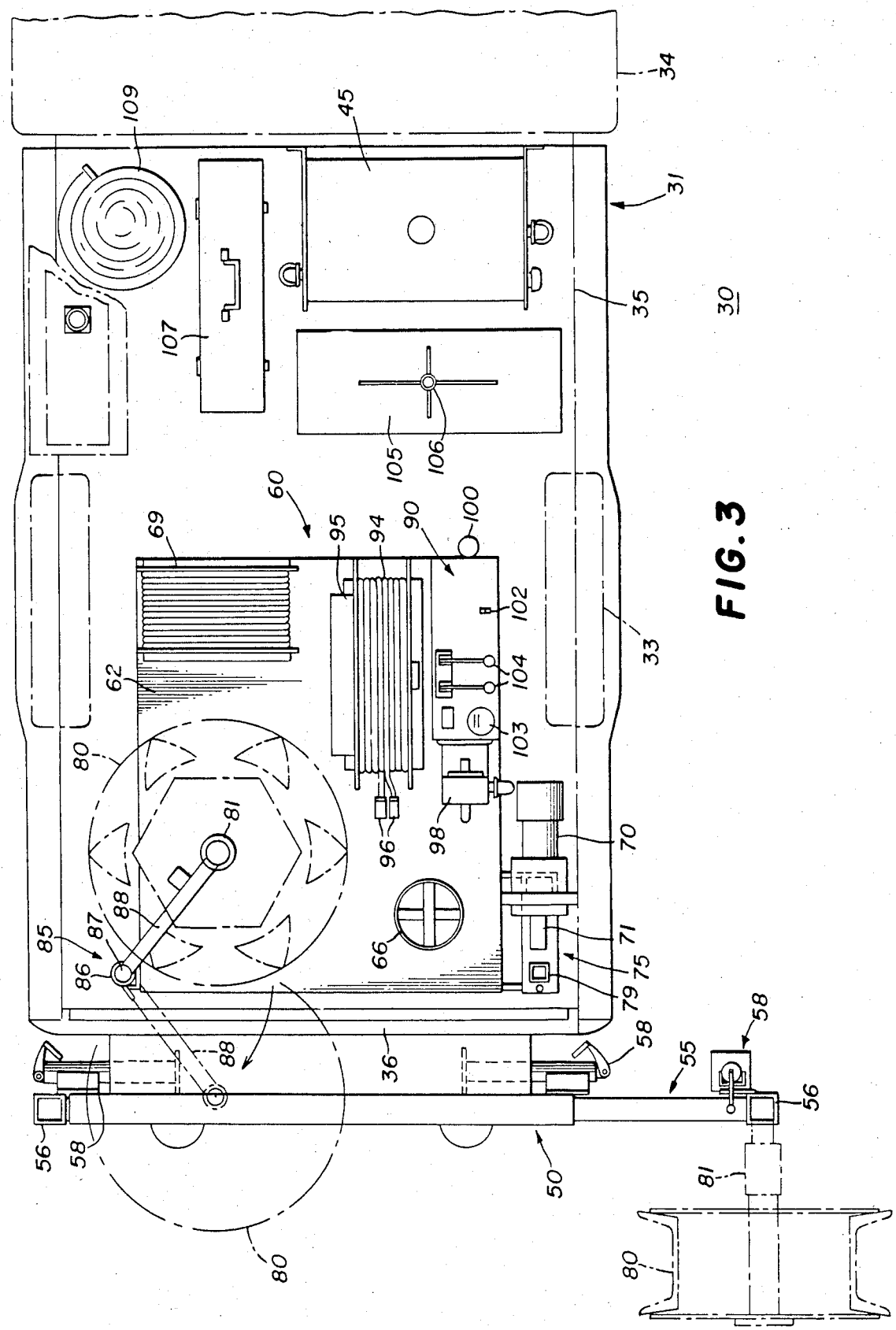
FIG. 3 is an enlarged, fragmentary view in horizontal section taken along the line 3—3 in FIG. 2, illustrating the cable pulling system, and illustrating the stowed, access and use positions of the take-up reel.
Figure 4:
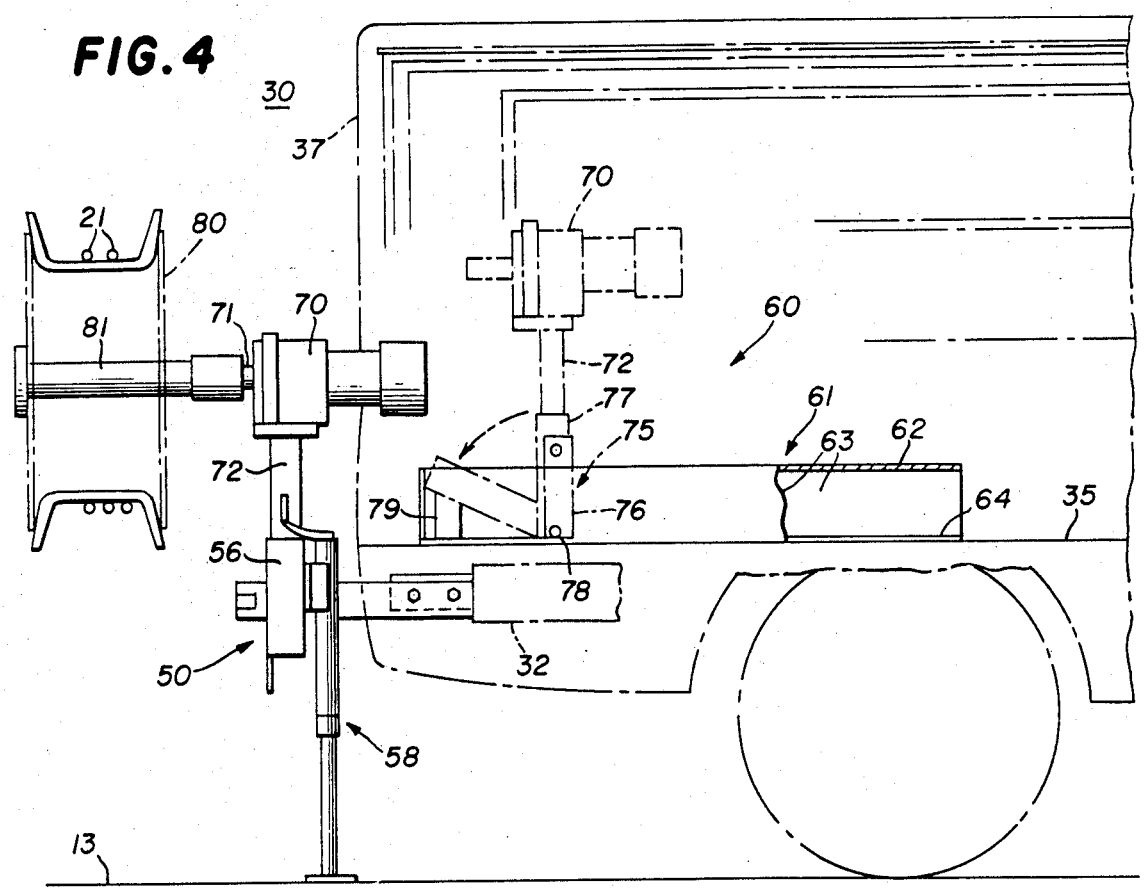
FIG. 4 is a fragmentary, side elevational view of a rear portion of the vehicle of FIG. 3, showing the equipment module pallet in partial section, and illustrating the winch assembly in its use configuration in solid line and in its storage condition in broken line.

Referring now also to FIGS. 2–4, the cable pulling system 30 includes a vehicle such as a truck 31 which, in a preferred embodiment of the invention, is a pickup truck. The truck 31 includes a chassis frame 32 (see FIG. 4) mounted on wheels 33 and having a cab 34 and a cargo bed 35. The cargo bed 35 is closed at the rear end thereof by a tailgate 36 (FIG. 1) and may be provided with a top or cover 37 which may be provided with windows 38 and a rear access door (not shown), in a known manner. Preferably, a warning light 39 is provided on the top of the highest portion of the truck 31.

Figure 5:
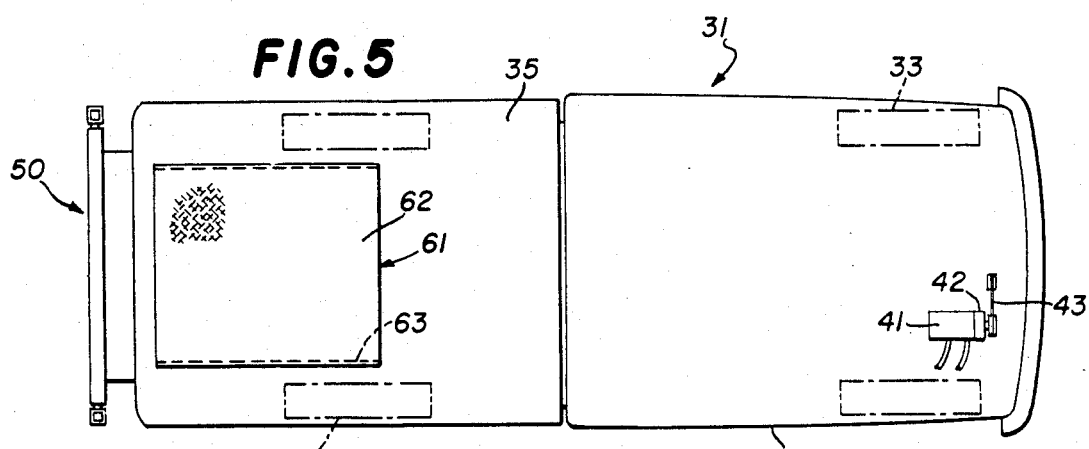
FIG. 5 is a top plan view of the vehicle of FIG. 2, with portions of the cable pulling system removed to illustrate the location of the hydraulic pump and the equipment module pallet.
Figure 6:
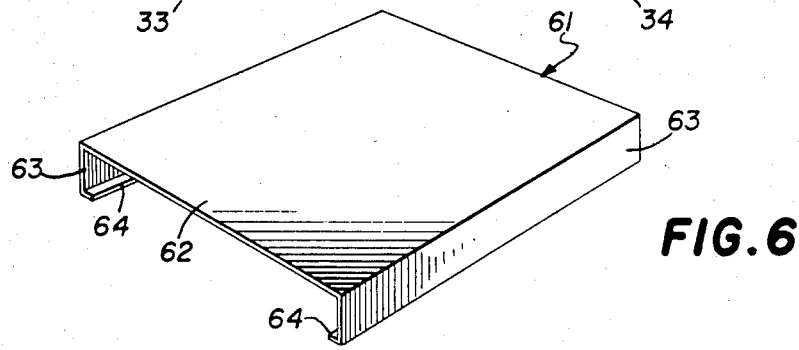
FIG. 6 is an enlarged perspective view of the equipment module pallet.
Figures 7, 8:
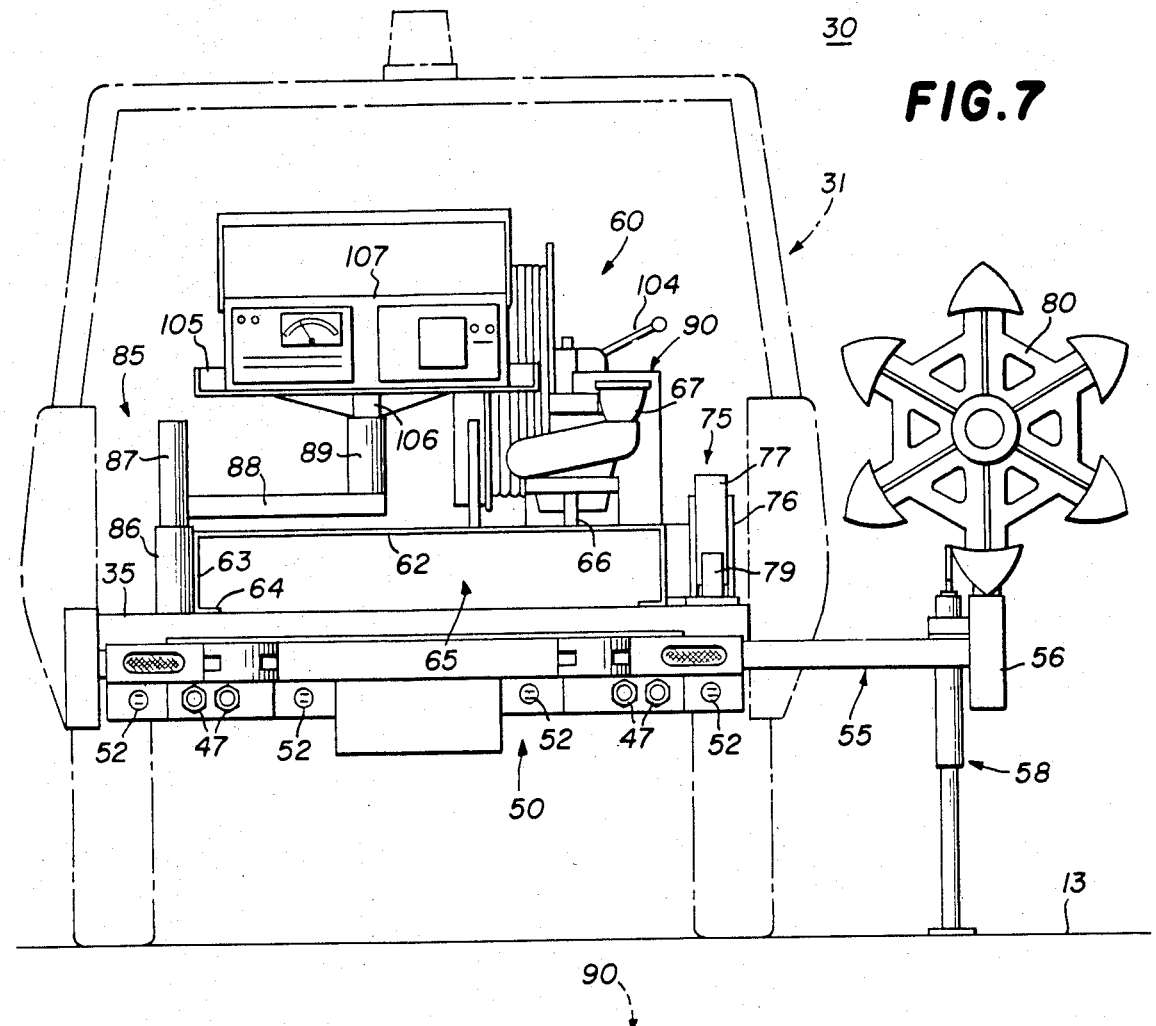
FIG. 7 is a rear elevational view of the vehicle of FIG. 4, illustrating the cable pulling system in its use configuration.
FIG. 8 is a schematic diagram of the hydraulic system of the present invention.

Referring also to FIGS. 5 and 8, the truck 31 is provided with an on-board hydraulic drive system 40. The hydraulic drive system 40 includes a pump 41 which is mounted in the engine compartment of the truck 31 and has an electric clutch 42 coupled to the truck engine by a fan belt 43. The system 40 also includes a hydraulic fluid reservoir tank 45 mounted in the cargo bed 35 at the forward end thereof (see FIG. 3). The pump 41 pumps hydraulic fluid from the tank 45 through the conduits of on-board plumbing and then back to the tank 45 through a filter 46. The hydraulic plumbing includes two pairs of quick-connect couplers 47 (FIGS. 7 and 8) which are disposed at a first access location on opposite sides of a rear bumper assembly 50 of the truck 31. Each pair of couplers 47 includes one coupler in circuit with the output of the pump 41, and another coupler in circuit with the return line to the tank 45.

Referring now to FIGS. 3, 4 and 7, the rear bumper assembly 50 is of the type disclosed in our copending U.S. application Ser. No. 827,768, filed on even date herewith, and entitled "Rear Bumper Assembly for Cable Pulling Truck", the disclosure of which application is incorporated herein by reference. Therefore, only so much of the rear bumper assembly 50 as is necessary for an understanding of the present invention, will be explained herein. The rear bumper assembly 50 includes a plurality of electrical outlet sockets 52 (FIG. 7) coupled to an on-board 12-volt electrical system on the truck 31, which may be powered by the truck battery. The rear bumper assembly 50 includes a pair of laterally extensible outrigger assemblies 55, each movable between a retracted stowed position and an extended use position, and each provided with a vertical support tube 56 at its outer end. Each outrigger assembly 55 also carries a jack assembly 58 which is pivotally movable between a horizontal storage condition (see left-hand outrigger assembly) and a vertically extending use condition (see right-hand outrigger assembly) for jacking engagement with the surface 13 of the ground or roadway.

Referring now to FIGS. 3–7, the cable pulling system 30 includes an equipment module 60 which is adapted to be removably mounted, as a unit, on the cargo bed 35 of the truck 31. The equipment module 60 includes a base frame in the form of a pallet 61, having a horizontal rectangular platform 62, integral at its opposite side edges with depending side leg flanges 63. Each of the side leg flanges 63 is integral at its lower end with an inwardly extending attachment foot flange 64. In use, the pallet 61 is positioned in the cargo bed 35, as illustrated in FIG. 5, and may be removably secured thereto by any suitable means. It will be appreciated that, when the pallet 61 is thus installed in place, it cooperates with the cargo bed 35 to define therebetween a storage space 65 (see FIG. 7) in which associated equipment, such as foldable manhole guard fences and the like, may be stored.

The equipment module 60 includes a number of components of the cable pulling system 30 which are mounted on the pallet 61. Thus, there is fixedly secured to the platform 62 a bracket 66 for mounting a hydraulically-operated sump pump 67 in a storage condition, when not in use. Also mounted on the platform 62 is a reel 69 of hydraulic conduit, for a purpose to be explained more fully below.

The cable pulling system 30 includes a hydraulic winch motor 70 having an output shaft 71 and a depending support leg 72, which is preferably a tubular member substantially square in transverse cross section. When not in use, the hydraulic winch motor 70 is mounted on a support assembly 75 carried by the pallet 61. More particularly, the support assembly 75 includes a mounting bracket 76, fixedly secured, as by welding, to one of the side leg flanges 63 of the pallet 61. A tubular stanchion 77, square in transverse cross section, is mounted on the bracket 76 for pivotal movement about the axis of a pivot pin 78 between an upright stowed position, illustrated in solid line in FIGS. 4 and 7, and a rearwardly inclined access position, illustrated in broken line in FIG. 4, and resting upon a stop member 79 which is also carried by the bracket 76. In use, the support leg 72 of the winch motor 70 is telescopically received in the stanchion 77. The stanchion 77 may be secured in its upright stowed position by suitable latch means (not shown). When it is desired to use the winch motor 70, the stanchion 77 is tilted rearwardly to its access position, to facilitate removal of the winch motor 70.

The cable pulling system 30 also includes a pick-up reel 80 having a hub 81. When not in use, the take-up reel 80 is mounted on a support assembly 85 carried by the pallet 61. More particularly, the support assembly 85 includes a tubular bracket 86 fixedly secured, as by welding, to the outer surface of the side leg flange 63 on the opposite side of the pallet 61 from the support assembly 85. The axis of the bracket 86 is oriented vertically, and it has telescopically coaxially received therein a pivot post 87 adapted for pivotal movement about its axis. Fixedly secured to the pivot post 87 and projecting radially outwardly therefrom in cantilever fashion is a support arm 88, carrying at its distal end an upstanding tubular support post 89 (see FIG. 7).

In use, the hub 81 of the take-up reel 80 is telescopically receivable in the support post 89 for supporting the take-up reel 80 in a storage condition. The support assembly 85 is pivotally movable between a stowed position, illustrated in solid line in FIG. 3, disposed well within the cargo bed 35, and an access position, illustrated in broken line in FIG. 3, projecting rearwardly from the cargo bed 35 to facilitate removal of the take-up reel 80.

The cable pulling system 30 also includes a hydraulic control console 90 which is fixedly mounted in place on the platform 62. Referring to FIG. 8, there is mounted within the console 90 a flow control valve 91 having an input port P adapted to be coupled to the output of the pump 41, a return port T adapted to be coupled to the return line leading to the tank 45, a controlled flow outlet port CF having a controlled flow of 9 gallons per minute, and an excess flow outlet port EF adapted to be coupled to the return line to the tank 45.

The controlled flow outlet port CF of the flow control valve 91 is coupled to the inlet port of a dual-control, multi-condition control valve 92. The valve 92 has four outlet ports, one of which is a neutral port N coupled to the return line which leads to the tank 45. An outlet port A is coupled through a check valve 93 to one of the lines of a dual hydraulic conduit 94 at a second access location, the conduit 94 preferably being coiled on a reel 95 mounted on the platform 62 of the pallet 61. The distal ends of the conduit lines 94 are provided with quick connect couplers 96. The control valve 92 also has an outlet port B coupled through a check valve 97 to the high pressure ones of the quick connect couplers 47, to one of which may be coupled an inlet port of a foot pedal-operated variable control valve 98, which may be stored in a suitable bracket (not shown) adjacent to the cabinet of the console 90 (see FIGS. 3 and 8). The valve 98 has a control outlet port O which is coupled to a dual conduit, and a return outlet port R which is coupled to the return line leading the tank 45 via a low pressure one of the quick connect couplers 47. The control valve 92 also has an outlet port C which is coupled to the inlet port P of a flow control valve 99. The flow control valve 99 has a return outlet port T coupled to the return line leading to the tank 45, a controlled flow outlet port CF, coupled to the high pressure one of the conduit lines 94, and and excess flow outlet port EF coupled to the high pressure ones of the quick connect couplers 47. The controlled flow outlet port CF has a flow of four gallons per minute. The low pressure ones of the quick connect couplers 47 and 96 are connected to the return line leading to the tank 45.

The hydraulic control console 90 also carries a throttle control 100 (FIG. 3) which is coupled by suitable mechanical linkage (not shown) to the throttle of the engine of the truck 31 for controlling the speed thereof, and thereby the rpm's of the pump 41. Also carried by the console 90 is a switch 102 for controlling the operation of the electric clutch 42, an engine hour meter 103 for recording the time that the truck engine is in operation while connected to the cable pulling system 30, and a pair of control handles 104 for the control valve 92.

More particularly, the valve 92 is a two-spool valve, with the spools respectively controlled by the handles 104. The first spool has two conditions, a neutral condition wherein all of the inlet flow is passed to the neutral outlet port N for deactivating the second spool, and an actuated condition wherein all of the inlet flow is directed to the second spool. The second spool has three conditions for respectively directing the entire inlet flow to corresponding ones of the outlet ports A, B and C. thus, it will be appreciated that when the outlet port A is open, the full 9 gpm flow is directed to the reeled conduit 94; when the outlet B is open, the full 9 gpm flow is directed through the valve 98 to the first access location at the quick connect couplers 47; and when the outlet portion C is open, the full 9 gpm flow is directed to the flow control valve 99. It will be appreciated that, in this latter condition, 4 gpm of the flow is directed to the second access location through the reeled conduit 94, while the remaining 5 gpm of the inlet flow is directed to the control valve 98 via a quick connect coupler 47 at the first access location.

The cable pulling system 30 also includes a tray 105 which is normally stored, when not in use, on the cargo bed 35. The tray 105 has a tubular mounting post 106 depending therefrom and adapted to be telescopically received in the support post 89 of the support assembly 85 for support thereby when the take-up reel 80 has been removed therefrom. There is also provided a tension controller 107 which is stored, when not in use, on the cargo bed 35 (FIG. 3) and is disposed in use on the tray 105, as illustrated in FIG. 7. The tension controller 107 is provided with a power cord (not shown) adapted to be plugged into an adjacent one of the outlet sockets 52 on the rear bumper assembly 50. The tension controller 107 is also adapted to be electrically coupled to the winch motor 70 and is responsive to the hydraulic pressure at the motor 70 for actuating a solenoid valve therein when the pressure reaches a predetermined level, which corresponds to a predetermined tension in the cable being pulled, all in a known manner. There may also be stowed on the pallet 61 a water hose 109 for the sump pump 67 (see FIG. 3).

In use, when it is desired to set up and operate the cable pulling system 30, the truck 31 is positioned in the desired location adjacent to the manhole 12, the outrigger assemblies 55 are extended and the associated jack assemblies 58 are jacked into contact with the ground 13, as illustrated in FIG. 1. If necessary, the sump pump 67 is removed from its bracket 66 and coupled to the hydraulic drive system 40 via the quick connected couplers 96. The water hose 109 is then coupled to the sump pump 67 and it is disposed in the chamber 11, the dual conduit 94 being unreeled from the reel 95 to accommodate this movement of the sump pump 67. Any desired length of conduit 94 may be stored on the reel 95.

The supply assembly 75 is then tilted rearwardly and the hydraulic winch motor 70 is removed therefrom and mounted in the vertical support tube 56 of the extended outrigger assembly 55, as illustrated in FIG. 4. The support assembly 85 is then swung out to its access position, and the take-up reel 80 is removed therefrom and mounted on the output shaft 71 of the winch motor 70, as illustrated in FIGS. 3 and 4. The winch motor 70 is then coupled to the hydraulic drive system 40 through the foot control valve 98, which preferably is provided with two sets of dual conduit having quick connect couplers 98a at the end thereof (FIG. 8), one set extending from the outlet port O and being connectable to the winch motor 70 and the other set extending from the inlet and return ports I and R and being connectable to the adjacent pair of quick connect couplers 47 on the rear bumper assembly 50. The tray 105 is mounted on the support post 89 and the tension controller 107 is placed thereon. The tension controller 107 is then electrically connected to the winch motor 70 and to an adjacent one of the electrical outlet sockets 52 on the rear bumper assembly 50 for powering the tension controller 107. The leading end of the cable pulling tape 21 is then wrapped around the take-up reel 80 and secured thereto and the cable pulling system 30 is ready for operation.

Normally, the engine of the truck 31 is left running, since it will normally be needed for powering other equipment such as floodlights and blowers for ventilation and/or heating of the chamber 11. When it is ready to begin the cable pulling operation, the switch 102 is activated to engage the clutch 42 and operate the pump 41 to pressurize the hydraulic drive system 40. The available system pressure can be controlled by changing the truck engine speed with the throttle control 100. While the setup of the cable pulling system 30 has been described when the hydraulic drive system 40 is deenergized, the setup procedure can also be performed while the hydraulic drive system 40 is energized. For this purpose, the two-condition control handle 104 of the control valve 92 is maintained in its neutral condition, in which condition the quick connect couplers 47 and 96 are not pressurized, so that coupling of the winch motor 70 and/or sump pump 67 thereto can be effected.

If only the sump pump 67 is to be operated, the three-position control handle 104 of the control valve 92 is operated to open the outlet port A. If only the winch motor 70 is to be operated, the control valve 92 is operated to open the outlet port B. The pressure to and speed of rotation of the winch motor 70 is then under the control of the foot pedal-operated control valve 98. If both the sump pump 67 and the winch motor 70 are to be operated simultaneously, the outlet port C of the control valve 92 is opened, providing a 4 gpm flow to the sump pump 67 and a 5 gpm flow to the control valve 98 for the winch motor 70.

It will be appreciated that the availability of outrigger assemblies 55 on both sides of the bumper assembly 50 affords great flexibility in positioning of the truck 31 with respect to the manhole 12. Furthermore, in the event that it is not possible to move the truck 31 close enough to the manhole 12, the foot-operated control valve 98 can be mounted remote from the truck 31. For this purpose, the auxiliary hydraulic conduit reel 69 is provided.

A significant aspect of the present invention is that the equipment module 60 and all of the equipment mounted thereon can be removed as a unit from the truck 31. Thus, in the event that any part of the equipment mounted on the equipment module 60 needs to be serviced, the entire equipment module 60 can be removed and another can be substituted therefor. In like manner, if the truck 31 needs to be taken out of service for repair or the like, or if it needs to be utilized for some other purpose, the equipment module 60 can be removed therefrom and installed in another truck, if desired. It will be appreciated that suitable connectors (not shown) are provided for connecting the hydraulic control console 90 of the equipment module 60 to the hydraulic drive system 40 and to the warning light 39 and the clutch 42 on the truck 31. Thus, it will be understood that whenever the equipment module 60 is to be removed, it is necessary to disconnect the fastening means which attach it to the cargo bed 35, and to disconnect the hydraulic couplings to the hydraulic drive system 40, the mechanical linkage coupling the throttle control 100 to the truck engine and the electrical connectors connecting the control console 90 to the warning light 39 and the clutch 42.

From the foregoing, it can be seen that there has been provided an improved cable pulling system which is characterized by modular construction of significant components thereof so that they can be removably mounted, as a unit, in an associated cable pulling vehicle.

We claim:

1. An equipment module for use in a cable pulling system which includes a vehicle with an on-board hydraulic drive system having a reservoir of hydraulic fluid, a pump and associated plumbing, said module comprising: a frame discrete from the associated vehicle, means for removably mounting said frame on the associated vehicle, a hydraulic control console mounted on said frame, means for coupling said control console to the hydraulic drive system when said frame is mounted on the vehicle, a hydraulic winch motor, first support means mounted on said frame for removably supporting said motor in a storage condition, said first support means including means accommodating movement thereof between first and second positions for respectively supporting said winch motor in stowed and access positions, a cable take-up reel, and second support means mounted on said frame for removably supporting said reel in a storage condition.

2. The equipment module of claim 1, and further comprising: conduit means carried by said frame for coupling said hydraulic winch motor to the hydraulic drive system.

3. The equipment module of claim 2, wherein said conduit means includes control valve means for controlling the operation of said winch motor.

4. The equipment module of claim 1, and further comprising: hydraulic sump pump means, and third support means on said frame for removably supporting said sump pump means in a storage condition.

5. The equipment module of claim 4, and further comprising: hydraulic conduit means having one end thereof coupled to the hydraulic drive system, means on the other end of said conduit means for coupling to said sump pump means, and fourth support means mounted on said frame for supporting said hydraulic conduit means.

6. The equipment module of claim 1, wherein said second support means includes means accommodating movement thereof between first and second positions for supporting said reel respectively in stowed and access positions.

7. The equipment module of claim 1, wherein said frame comprises a pallet having a flat horizontal platform and a pair of support legs depending therefrom.

8. An equipment module for use in a cable pulling system which includes a vehicle with an on-board hydraulic drive system having a reservoir of hydraulic fluid, a pump and associated plumbing with first and second access locations at which coupling to the plumbing may be readily effected, said module comprising: a frame discrete from the associated vehicle, means for removably mounting said frame on the associated vehicle, a hydraulic control console mounted on said frame, means for coupling said control console to the hydraulic drive system when said frame is mounted on the vehicle, said control console including valve means operable among three conditions for respectively supplying pressurized hydraulic fluid only to said first access location or only to said second access location or simultaneously to both of said access locations, a hydraulic winch motor, first support means mounted on said frame for removably supporting said motor in a storage condition, said first support means including means accommodating movement thereof between first and second positions for respectively supporting said winch motor in stowed and access positions, a cable take-up reel, second support means mounted on said frame for removably supporting said reel in a storage condition, a hydraulic sump pump, third support means mounted on said frame for removably supporting said sump pump in a storage condition, hydraulic conduit means having one end thereof coupled to the hydraulic system at the second access location, and fourth support means mounted on said frame for supporting said hydraulic conduit means.

9. The equipment module of claim 8, wherein said fourth support means includes a reel mounted on said frame for rotation about a horizontal axis.

10. The equipment module of claim 8, and further comprising second hydraulic conduit means carried by said frame for coupling said winch motor to the hydraulic drive system at the first access location.

11. The equipment module of claim 8, wherein said second hydraulic conduit means includes motor control means for controlling the pressure to said hydraulic winch motor.

12. The equipment module of claim 8, wherein said control console includes flow control means for limiting the rate of flow of hydraulic fluid to said winch motor and said sump pump.

13. A cable pulling system comprising: a truck having a cargo bed; a hydraulic drive system mounted on said truck, said hydraulic drive system including a reservoir of hydraulic fluid, a pump coupled to said engine for driving thereby, and plumbing interconnecting said pump and said reservoir and having first and second access locations on said truck at which coupling to the plumbing may be readily effected; an equipment module discrete from the truck and removably mountable on said cargo bed, said module including a frame, a hydraulic control console mounted on said frame, means for coupling said control console to said hydraulic drive system when said module is mounted on said cargo bed, a hydraulic winch motor removaly supported on said frame in a storage condition, support means movable between first and second positions for respectively supporting said winch motor in stowed and access positions, a cable take-up reel removably supported on said frame in a storage condition, a hydraulic sump pump removably supported on said frame in a storage condition, and hydraulic conduit means supported on said frame and having one end thereof coupled to said hydraulic drive sytem at said second access location when said module is mounted on said truck bed; mounting means on said truck for mounting said winch motor and said take-up reel in a use configuration for pulling cable; and means for coupling said winch motor to said hydraulic drive system at said first access location when said winch motor is disposed in its use configuration.

14. The cable pulling system of claim 13, and further comprising an electrical system mounted on said truck for providing connection between an associated source of electric potential and access terminals on said truck.

15. The cable pulling system of claim 14, and further comprising tension control means carried by said truck, and means for coupling said tension control means to said winch motor and to said electrical system for deenergizing said motor in response to a predetermined hydraulic pressure thereat.

16. The cable pulling system of claim 15, and further comprising a support tray carried by said truck for supporting said tension control means in a use position on said frame.

17. The cable pulling system of claim 13, and further comprising a top removably mountable on said cargo bed for covering same.

18. The cable pulling system of claim 13, and further comprising reel means carrying said hydraulic conduit means and mounted on said frame for rotation about a horizontal axis.

19. The cable pulling system of claim 13, wherein said means for coupling said winch motor to said hydraulic drive system includes auxiliary hydraulic conduit means, and further comprising reel means mounted on said frame for carrying said auxiliary hydraulic conduit means.

* * * * *